(12) United States Patent
Herman-Saffar et al.

(10) Patent No.: US 12,169,844 B2
(45) Date of Patent: Dec. 17, 2024

(54) METHODS AND SYSTEMS FOR IDENTIFYING BREAKPOINTS IN VARIABLE IMPACT ON MODEL RESULTS

(71) Applicant: EMC IP Holding Company LLC, Hopkinton, MA (US)

(72) Inventors: Or Herman-Saffar, Ofakim (IL); Amihai Savir, Sansana (IL); Anat Parush-Tzur, Beit Kama (IL); John Lawrence Dalton, Austin, TX (US); Alana Brook Marcum Barker, Austin, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 19 days.

(21) Appl. No.: 17/363,692

(22) Filed: Jun. 30, 2021

(65) Prior Publication Data

US 2023/0004991 A1    Jan. 5, 2023

(51) Int. Cl.
*G06Q 30/0201* (2023.01)
*G06F 18/214* (2023.01)
*G06N 20/00* (2019.01)
*G06Q 30/0202* (2023.01)

(52) U.S. Cl.
CPC ....... *G06Q 30/0201* (2013.01); *G06F 18/214* (2023.01); *G06N 20/00* (2019.01); *G06Q 30/0202* (2013.01)

(58) Field of Classification Search
None
See application file for complete search history.

(56) References Cited

U.S. PATENT DOCUMENTS

| | | | | |
|---|---|---|---|---|
| 11,176,495 | B1* | 11/2021 | Ron | G06Q 30/0201 |
| 2016/0259705 | A1* | 9/2016 | Barsness | G06F 11/3093 |
| 2019/0378010 | A1* | 12/2019 | Morris | G06Q 20/4093 |
| 2020/0012584 | A1* | 1/2020 | Walters | G06F 16/335 |
| 2020/0134489 | A1* | 4/2020 | Achin | G06Q 10/06 |
| 2021/0142253 | A1* | 5/2021 | Cohen | G06Q 30/0202 |
| 2021/0264332 | A1* | 8/2021 | Pingali | G06Q 10/0631 |

OTHER PUBLICATIONS

Lee, Wei-Han, et al. "Time series segmentation through automatic feature learning." arXiv preprint arXiv:1801.05394 (2018). (Year: 2018).*

* cited by examiner

*Primary Examiner* — Chesiree A Walton
(74) *Attorney, Agent, or Firm* — Chamberlain, Hrdlicka, White, Williams & Aughtry; Aly Dossa

(57) ABSTRACT

Techniques described herein relate to a method for identifying breakpoints. The method may include obtaining, by a breakpoint identification device, an entity group data set corresponding to an entity group; generating, using the entity group data set, an enhanced entity group data set comprising the entity group data set and a derived data item; performing a clustering analysis using at least a portion of the enhanced entity group data set to obtain a plurality of entity clusters; training a machine learning (ML) model using the enhanced entity group data set to obtain a trained ML model; using the trained ML model and a set of simulated entities to perform a breakpoint analysis; generating a breakpoint graph based on the breakpoint analysis; and providing recommendations to an interested entity based on a breakpoint identified using the breakpoint graph.

15 Claims, 6 Drawing Sheets

METHODS AND SYSTEMS FOR IDENTIFYING BREAKPOINTS IN VARIABLE IMPACT ON MODEL RESULTS

BACKGROUND

Groups of entities often perform activities to achieve one or more results. Often, the activities of such entities, and other factors relating to said activities (collectively, variables), have an impact on a given result. However, it is often difficult to discern the relationship between such variables and the result.

SUMMARY

In general, embodiments described herein relate to a method for identifying breakpoints. The method may include obtaining, by a breakpoint identification device, an entity group data set corresponding to an entity group; generating, using the entity group data set, an enhanced entity group data set comprising the entity group data set and a derived data item; performing a clustering analysis using at least a portion of the enhanced entity group data set to obtain a plurality of entity clusters; training a machine learning (ML) model using the enhanced entity group data set to obtain a trained ML model; using the trained ML model and a set of simulated entities to perform a breakpoint analysis; generating a breakpoint graph based on the breakpoint analysis; and providing recommendations to an interested entity based on a breakpoint identified using the breakpoint graph.

In general, embodiments described herein relate to a non-transitory computer readable medium that includes computer readable program code, which when executed by a computer processor enables the computer processor to perform a method for identifying breakpoints. The method may include obtaining, by a breakpoint identification device, an entity group data set corresponding to an entity group; generating, using the entity group data set, an enhanced entity group data set comprising the entity group data set and a derived data item; performing a clustering analysis using at least a portion of the enhanced entity group data set to obtain a plurality of entity clusters; training a machine learning (ML) model using the enhanced entity group data set to obtain a trained ML model; using the trained ML model and a set of simulated entities to perform a breakpoint analysis; generating a breakpoint graph based on the breakpoint analysis; and providing recommendations to an interested entity based on a breakpoint identified using the breakpoint graph.

In general, embodiments described herein relate to a system for identifying breakpoints. The system may include a breakpoint identification device, executing on a processor comprising circuitry. The break point identification device may be configured to obtain, by a breakpoint identification device, an entity group data set corresponding to an entity group; generate, using the entity group data set, an enhanced entity group data set comprising the entity group data set and a derived data item; perform a clustering analysis using at least a portion of the enhanced entity group data set to obtain a plurality of entity clusters; train a machine learning (ML) model using the enhanced entity group data set to obtain a trained ML model; use the trained ML model and a set of simulated entities to perform a breakpoint analysis; generate a breakpoint graph based on the breakpoint analysis; and provide recommendations to an interested entity based on a breakpoint identified using the breakpoint graph.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
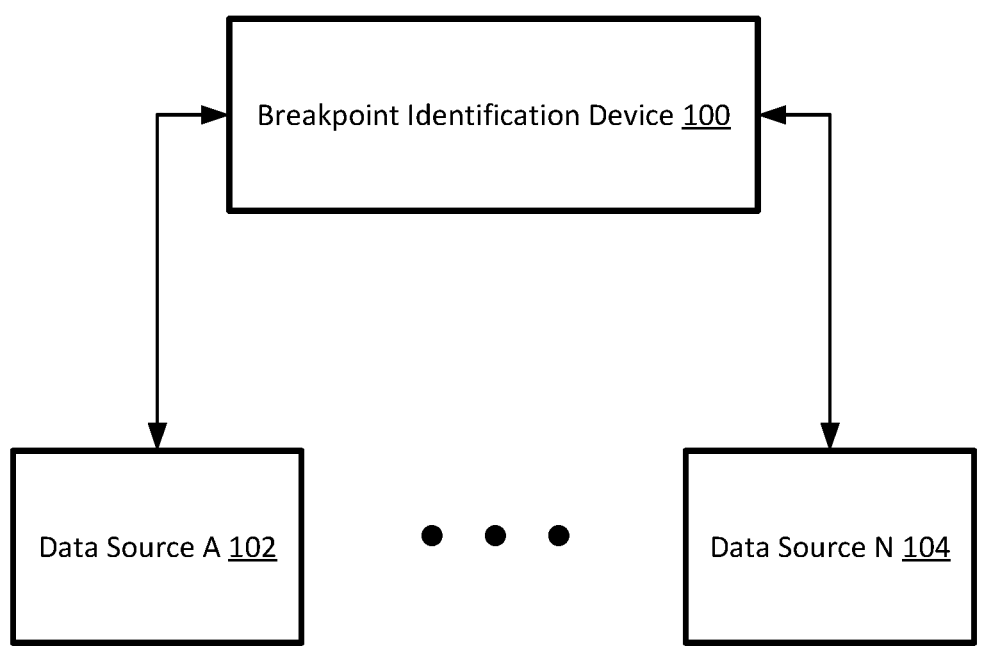
FIG. 1A shows a diagram of a system in accordance with one or more embodiments of the invention.

Specific embodiments will now be described with reference to the accompanying figures.

In the below description, numerous details are set forth as examples of embodiments described herein. It will be understood by those skilled in the art, that also have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for identifying breakpoints for input variables relative to a given result for a given group of entities. In one or more embodiments, the individual entities in the group of entities try to achieve one or more results (e.g., make sales of goods and/or services), and it may be desirable to analyze the variables to determine if changing (e.g., increasing) one or more of the variables associated with the entities causes a desired change in the results (e.g., increased sales revenue).

As an example, such an analysis may yield that, for a given salesperson (e.g., an entity), having a greater percentage of transactions occur online increases the revenue generated by that salesperson. Additionally, such an analysis may yield that there are certain values for a given variable that, if above or below, lead to a greater or lesser rate of change for a given result. Continuing the previous example, the analysis may show that increasing percentage of online transactions correlates with rapidly increasing sales revenue up to 40%, but that the rate of increase of sales revenue relative to online transaction percentage increases much less rapidly (e.g., is 'relatively flat') between 40% and 60%. In such an example, 40% can be considered a 'breakpoint', which, in one or more embodiments, is a variable value around which the rate of change of a correlated result differs. In one or more embodiments, such breakpoints may be used to generate recommendations for entities to improve a desired result. Continuing again with the previous example, a recommendation may be made to a company to take steps to increase salespersons percentage of online transactions to 40%, but that additional efforts to cause increases between 40% and 60% will have diminishing returns.

To discover relevant breakpoints, in one or more embodiments, data relating to a given group of entities (e.g., sales representatives of a company) is obtained. In one or more embodiments, there may be any number of data items obtained for each entity in the group of entities (e.g., 100). In one or more embodiments, each item of information relating to an entity may be referred to as a variable. In one or more embodiments, such variables may be used to derive additional items of information relating to one or more given entities in the group. In one or more embodiments, the combination of obtained data items and derived data items may be referred to as an enhanced entity group data set.

In one or more embodiments, the enhanced entity group data set is used to perform a clustering analysis. In one or more embodiments, the clustering analysis is performed using any suitable clustering algorithm capable of using the enhanced entity group data set to identify two or more clusters of entities.

Next, in one or more embodiments, the enhanced entity group data set is used as a training data set to train a machine learning (ML) model. The ML model may be any ML model capable of producing a result (e.g., a prediction) based on a set of input data. As an example, the ML model may be a random forest model used to predict sales revenue based on input variables associated with sales representatives (i.e., the entities). In one or more embodiments, during or after the training of the ML model, important variables are identified. In one or more embodiments, important variables are input variables that have a significant impact on the result, while unimportant variables do not. Important variables may be identified by any means for doing so. As an example, the ML model being used may inherently produce results that indicate variable (i.e., feature) importance. A As another example, the ML model may not produce a measure of feature importance, and other techniques (e.g., Fisher Score, Information Gain, etc.) may be used to derive relative feature importance. As another example, SHapeley Additive exPlanation (SHAP) values may be calculated for input variables. In one or more embodiments, a SHAP value represents an allocation of relative credit to input variables for impact on the result of an ML model. In one or more embodiments, the ML model training may further include refining the model by removing unimportant features from the data set. Such unimportant features may be features that have a lower impact on the accuracy of the result of the ML model. In one or more embodiments, such features are iteratively removed while assessing the impact on the accuracy of the model until a minimum number of input variables remain that still produce results above a desired accuracy threshold. In one or more embodiments, a trained ML model with a minimum number of important features is the result of the aforementioned training.

In one or more embodiments, the trained ML model is then used to identify breakpoints. In one or more embodiments, breakpoints are identified by executing the ML model using any number of simulated entities. In one or more embodiments, a simulated entity is a set of input variables that represent a hypothetical entity of the group of entities. In one or more embodiments, input variables associated with a simulated entity are derived based on the actual entity group data previously obtained. In one or more embodiments, a particular input variable is selected to be modified to determine the impact on the ML model result of varying the input variable. In one or more embodiments, the previously identified clusters may be used to determine if any other input variables must be modified along with the selected input variable. In one or more embodiments, the cluster information is used to ensure that when a modification is applied to the selected input variable, real-world values for the other input variables are used. As an example, if the selected input variable is online transactions as a percentage of total transactions, and it is to be modified to 60%, cluster data may be assessed to determine a possible value for total number of daily calls that corresponds to a real world salesperson in the cluster that has the 60% value for online transactions. In one or more embodiments, such modification of other input variables improves the value of the result, as it helps ensure that any recommendations that may be made based on the analysis are possible to implement.

In one or more embodiments, the selected input variable is varied over any range of possible values. As an example, online transactions as a percentage of total transactions may be varied between 0% and 100%. In one or more embodiments, each modified version of the selected input variable is used along with values for the other input variables for the trained ML model to determine a result (e.g., predicted sales revenue). In one or more embodiments, a graph is generated of the modified selected variable values versus the ML model result. In one or more embodiments, the graph is used to identify one or more breakpoints for the selected input variable, which are shown on the graph as points where the rate of change of the result variable differ before and after. In one or more embodiments, the above-described breakpoint analysis is performed for each of the identified important values, thereby generating a breakpoint graph and identified breakpoints for each such input variable. In one or more embodiments, the breakpoint analysis is performed based on a simulated entity representing the entire group of entities for which data was obtained. Additionally or alternatively, the breakpoint analysis may be performed based on a simulated entity that is based on an identified cluster within the group of entities. In one or more embodiments, tailoring the breakpoint analysis for a given cluster may make the results and recommendations more relevant to entities in the cluster than recommendations based on the entire group of entities.

In one or more embodiments, the identified breakpoints are used to generate recommendations. In one or more embodiments, the recommendations relate to how entities in the entity group could change to effect a desired change in results. As an example, a recommendation to a company may include that salespersons within a given identified cluster that have online transactions as a percentage of total transaction less than 30% should increase their online transactions to at least 30%, which should result in increased sales revenue for the company.

FIG. 1A shows a diagram of a system in accordance with one or more embodiments described herein. The system may include a breakpoint identification device (100) operatively connected to any number of data sources (e.g., data source A (102), data source N (104)). Each of these components is described below.

In one or more embodiments, data sources (102, 104) may be any source of information about a particular group of entities. In one or more embodiments, information from data sources (102, 104) may be obtained using any method of gathering data. As an example, the data may be obtained manually by reviewing physical records of a company. As another example, the data sources may be computing devices (e.g., data source nodes) from which data is obtained manually or automatically (e.g., using data collection software).

In one or more embodiments, at least a portion of the data sources (102, 104) are computing devices. In one or more embodiments, as used herein, a data source (102, 104) may be any computing device, collection of computing devices, portion of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, an enterprise data storage array etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or data source (102, 104). Other types of computing devices may be used as data source without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a data source (102, 104) includes functionality to generate or otherwise provide any amount or type of variable data that is related to a particular group of entities (e.g., sales representatives of a company). As used herein, a variable may be any item of information, and there may be any number of such variables. As an example, variables related to sales representatives of a company may include, but are not limited to online transactions, online revenue generated, average daily total calls, average call time, data related to number of sessions and/or usage time of various sales tools available to the sales representative, tenure with the company, number of team members, total revenue, margin, transactions, revenue targets, margin targets, offline revenue, quarterly averages, number of orders, sales related to products from different company divisions, portfolio focus, number of customer accounts managed, average account revenue, etc.

In one or more embodiments, the system also includes a breakpoint identification device (100). In one or more embodiments, the breakpoint identification device (100) is operatively connected to the data sources (102, 104). A breakpoint identification device (100) may be separate from and connected to any number of data sources (102, 104). In one or more embodiments, the breakpoint identification device (100) is a computing device (described above).

In one or more embodiments, the breakpoint identification device (100) includes functionality to receive entity group data from any number of data sources (102, 104). In one or more embodiments, the breakpoint identification device also includes functionality to use the entity group data set to train and validate a ML model, and to use the ML model to identify breakpoints. The functionality of the breakpoint identification device is discussed further in the descriptions of FIG. 1B and FIG. 2, below.

In one or more embodiments, the data sources (102, 104) and the breakpoint identification device (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
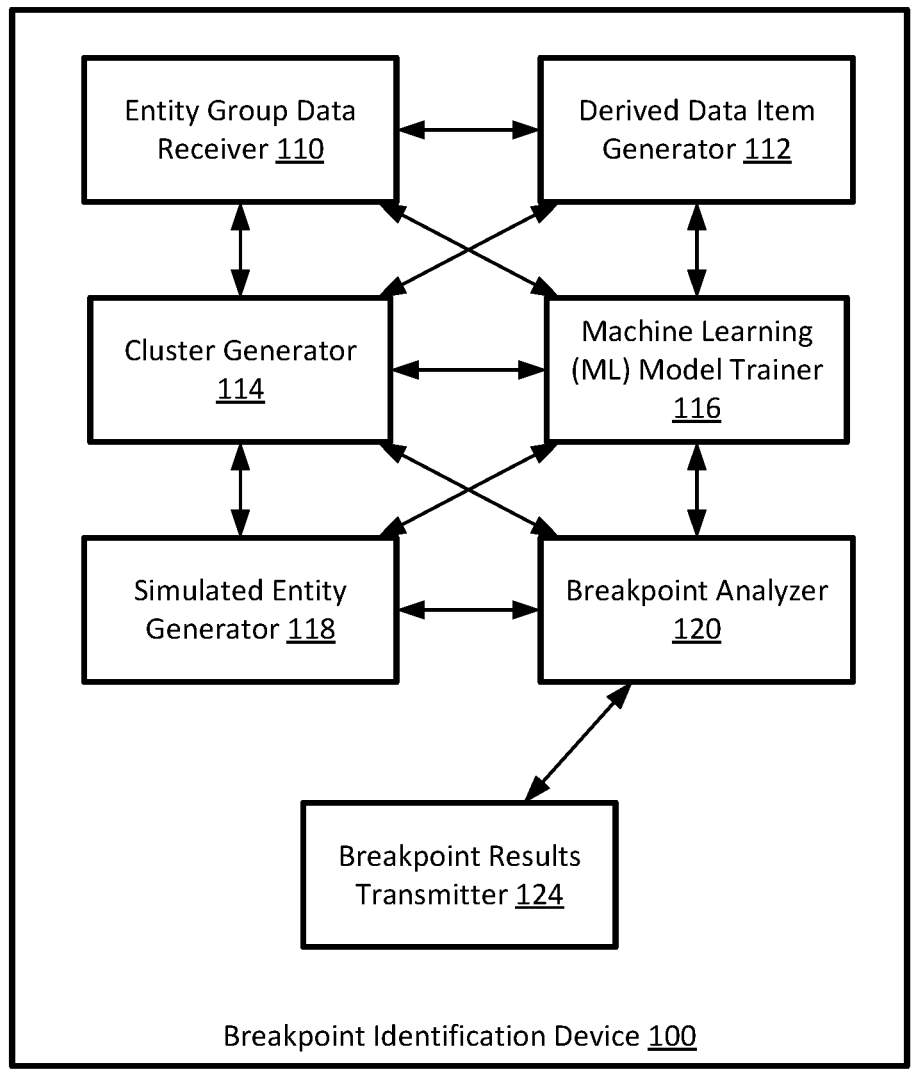
FIG. 1B shows a diagram of a breakpoint identification device in accordance with one or more embodiments of the invention.

FIG. 1B shows an example diagram of a breakpoint identification device (100) in accordance with one or more embodiments described herein. The breakpoint identification device (100) may include any number of components. As shown in FIG. 1B, the breakpoint identification device (100) includes an entity group data receiver (110), a derived data item generator (112), a cluster generator (114), a ML model trainer (116), a simulated entity generator (118), breakpoint analyzer (120), and an breakpoint results transmitter (124). Each of these components is described below.

In one or more embodiments, a breakpoint identification device (100) is all or any portion of a computing device (e.g., breakpoint identification device (100) of FIG. 1A), as discussed above in the description of FIG. 1A.

In one or more embodiments, the breakpoint identification device (100) includes an entity group data receiver (110). In one or more embodiments, an entity group data receiver (110) is any hardware (e.g., circuitry), software, firmware, or any combination thereof that includes functionality to obtain/receive entity group data for one or more variables from one or more data sources. In one or more embodiments, entity group data is received in any manner capable of collecting data from computing devices (e.g., via, at least in part, one or more network interfaces of the breakpoint identification device (100)) or any other data collection technique. In one or more embodiments, entity group data is any data about any aspect of entities of an entity group. For example, the entities of an entity group may be sales representatives at a given company, and entity group data may include, but is not limited to, online transactions, online revenue generated, average daily total calls, average call time, data related to number of sessions and/or usage time of various sales tools available to the sales representative, tenure with the company, number of team members, total revenue, margin, transactions, revenue targets, margin targets, offline revenue, quarterly averages, number of orders, sales related to products from different company divisions, portfolio focus, number of customer accounts managed, average account revenue, etc. Any data related to any entity group may be entity group data without departing from the scope of embodiments described herein. In one or more embodiments, entity group data received by the breakpoint identification device (100) is stored in any storage device or devices included in, operatively connected to, or otherwise available to the breakpoint identification device (100).

In one or more embodiments, the breakpoint identification device (100) includes a derived data item generator (112). In one or more embodiments, the derived data item generator (112) is operatively connected to the entity group data receiver (110). In one or more embodiments, a derived data item generator (112) is any hardware (e.g., circuitry), software, firmware, or any combination thereof that includes functionality to use entity group data to derive new data items related to entities of the entity group. As an example, entity group data items for a given entity in the group may include information about accounts managed by a sales representative, and if a certain percentage or more of such accounts are within one industry, then an industry focus label may be a derived data item that indicates the industry focus for the sales representative. Any other entity group data may be used to derive any derived data item without departing from the scope of embodiments disclosed herein. In one or more embodiments, the entity group data and the derived data items may be combined to create an enhanced entity group data set.

In one or more embodiments, the breakpoint identification device (100) includes a cluster generator (114). In one or more embodiments, the cluster generator (114) is operatively connected to the entity group data receiver (110) and the derived data item generator (112). In one or more embodiments, the cluster generator is any hardware (e.g., circuitry), software, firmware, or any combination thereof that includes functionality to use the enhanced entity group data (i.e., the entity group data and the derived data items) to group entities of the entity group into clusters of entities.

In one or more embodiments, the cluster generator (114) includes functionality to generate clusters using the enhanced entity data set for the entity group. In one or more embodiments, the cluster generator (114) is configured to use any clustering algorithm to identify the clusters, and there may be any number of identified clusters. The number of identified clusters may depend, at least in part, on the data of the enhanced entity group data set. As an example, the cluster generator (114) may a clustering algorithm such as a Hierarchical Density-Based Spatial Clustering of Applications with Noise (HDBSCAN). In one or more embodiments, HDBSCAN uses the data to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted health data items were used as the data set by the cluster generator (114). One of ordinary skill in the art will appreciate that any other clustering analysis algorithm or scheme (e.g., K-means, mean-shift, expectation-maximization, agglomerative hierarchical, etc.) may be used without departing from the scope of embodiments described herein. In one or more embodiments, the cluster generator uses all or any portion of the enhanced entity group data set to identify clusters. As an example, the cluster generator (114) may use only data items related to entities in the entity group that do not change often or at all, such as tenure, number of team members, etc.

In one or more embodiments, the breakpoint identification device (100) includes a ML model trainer (116). In one or more embodiments, the ML model trainer (116) is operatively connected to the entity group data receiver (110) (e.g., by way of a storage device), the derived data item generator (112) and the cluster generator (114). In one or more embodiments, the ML model trainer (116) is any hardware (e.g., circuitry), software, firmware, or any combination thereof that includes functionality to train and/or validate a ML model using the enhanced entity group data set. In one or more embodiments, the data items of the enhanced entity group data set are used as input variables, and along with known results (e.g., sales revenue values), are used to train and validate an ML model. For example, a random forest model may be trained using such data. Any other ML model capable of being trained to predict a result based on input data may be used without departing from the scope of embodiments described herein.

In one or more embodiments, the ML model trainer also includes functionality to identify important variables. In one or more embodiments, an important variable is any data item used as an input variable model that has a significant impact on the result(s) produced by the ML model. As an example, the ML model being used may inherently produce results that indicate variable (i.e., feature) importance. A As another example, the ML model may not produce a measure of feature importance, and other techniques (e.g., Fisher Score, Information Gain, etc.) may be used to derive relative feature importance. As another example, SHapeley Additive exPlanation (SHAP) values may be calculated for input variables. In one or more embodiments, a SHAP value represents an allocation of relative credit to input variables for impact on the result of an ML model. In one or more embodiments, the ML model training may further include refining the model by removing unimportant features from the data set. Such unimportant features may be features that have a lower impact on the accuracy of the result of the ML model. In one or more embodiments, such features are iteratively removed while assessing the impact on the accuracy of the model until a minimum number of input variables remain that still produce results above a desired accuracy threshold. In one or more embodiments, a trained ML model with a minimum number of important features is the result of the aforementioned training by the ML model trainer (116).

In one or more embodiments, the breakpoint identification device (100) includes a simulated entity generator (118). In one or more embodiments, a simulated entity generator (118) is operatively connected to the cluster generator (114) and the ML model trainer (116). In one or more embodiments, the simulated entity generator (118) is any hardware (e.g., circuitry), software, or any combination thereof that includes functionality to generate any number of simulated entities to use in breakpoint analysis. In one or more embodiments, a simulated entity is a collection of input variables for a trained ML model that represent a hypothetical real entity from the entity group corresponding to the entity group data. A simulated entity may be any combination of actual variable values taken from or created using the enhanced entity group data set, and modified variables adjusted to simulate an entity having different input variables. As an example, a set of entity input variables may be combined with a variable that is modified to a number of different values for the modified variable, thereby creating a number of simulated entities for use in a breakpoint analysis.

In one or more embodiments, the breakpoint identification device (100) includes a breakpoint analyzer (120). In one or more embodiments, the breakpoint analyzer is operatively connected to the cluster generator (114), the ML model trainer (116), and the simulated entity generator (118). In one or more embodiments, the breakpoint analyzer (120) is any hardware (e.g., circuitry), software, firmware, or any combination thereof that includes functionality to use simulated entities generated by simulated entity generator (118) and trained ML models from ML model trainer (116) to generate breakpoint graphs for input variables versus results, and to identify breakpoints therein. The functionality of the breakpoint analyzer is discussed further in the description of FIG. 2, below. Example breakpoint graphs are shown in FIG. 3A and FIG. 3B, which are described below.

In one or more embodiments, the breakpoint identification device (100) includes a breakpoint results transmitter (124). In one or more embodiments, the breakpoint results transmitter (124) is operatively connected to the breakpoint analyzer (120), and thus has access to the breakpoint analysis results produced therefrom. In one or more embodiments, the breakpoint results transmitter (124) is any hardware (e.g., circuitry), software, firmware, or any combination thereof that includes functionality to transmit data using any type of data transmission. In one or more embodiments, the data transmitted is the breakpoint analysis results, and recommendations related thereto. In one or more embodiments, the results are transmitted to any interested entity. As an example, the results may be transmitted over a network to a manager of a solution sales team that is seeking to understand what data items related to sales representatives should be changed in order to increase sales revenue.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices. As another example, a single component may be configured to perform all or any portion of any of the functionality performed by the components shown in FIG. 1B. Accordingly, embodiments disclosed herein should not be limited to the configuration of components shown in FIG. 1B.

Figure 2:
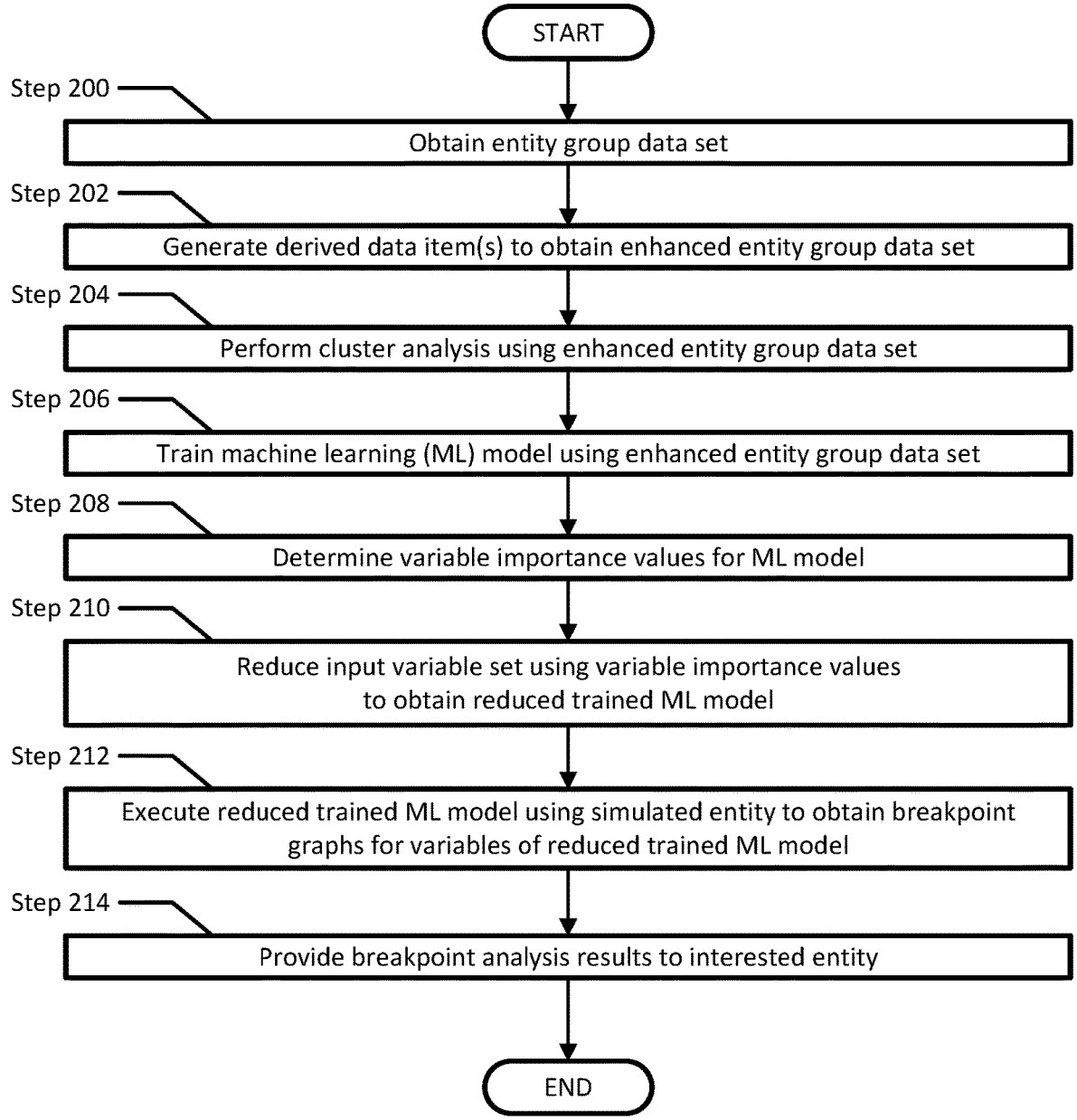
FIG. 2 shows a flowchart in accordance with one or more embodiments of the invention.
Figure 3A:
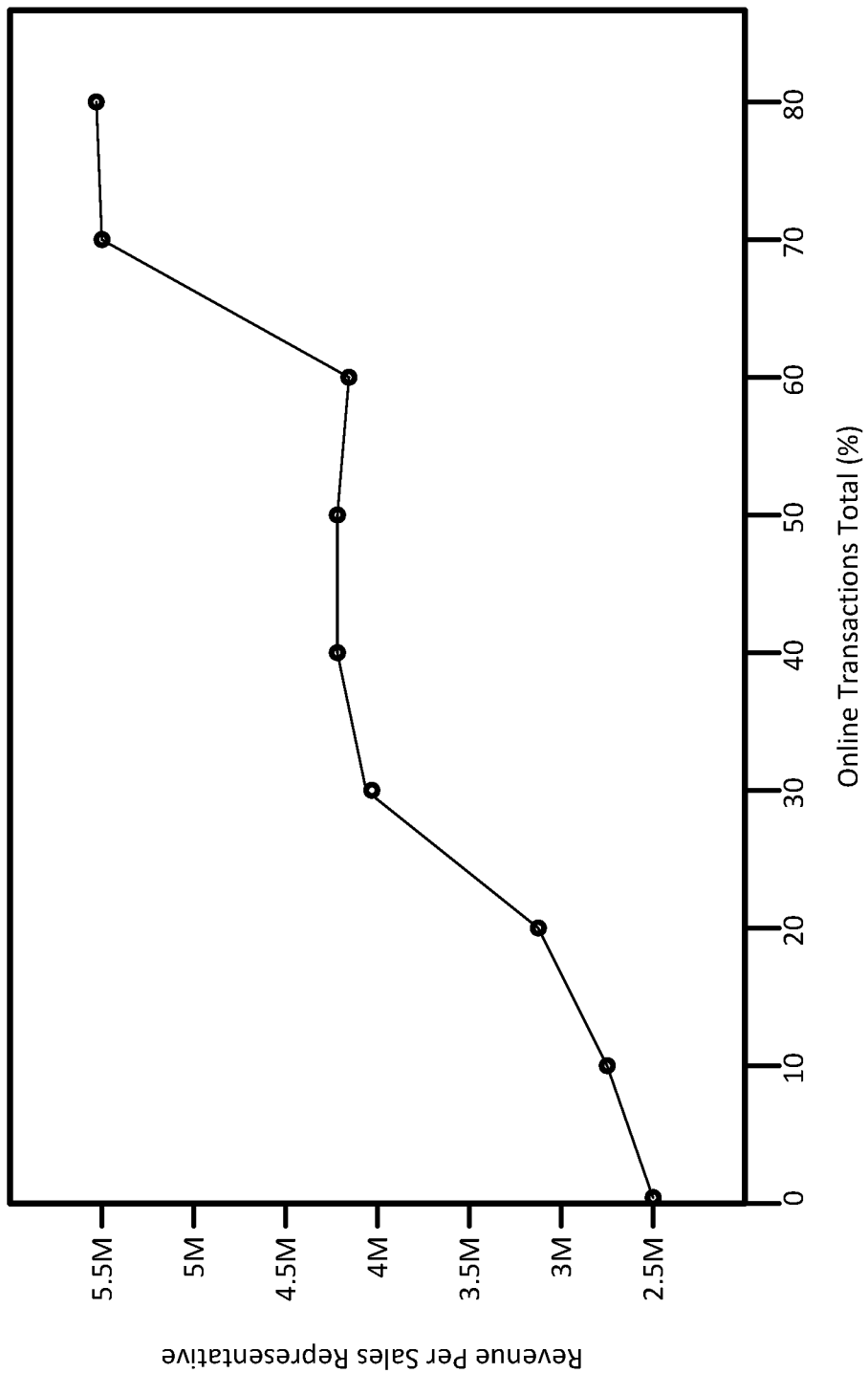
FIG. 3A shows an example in accordance with one or more embodiments of the invention.
Figure 3B:
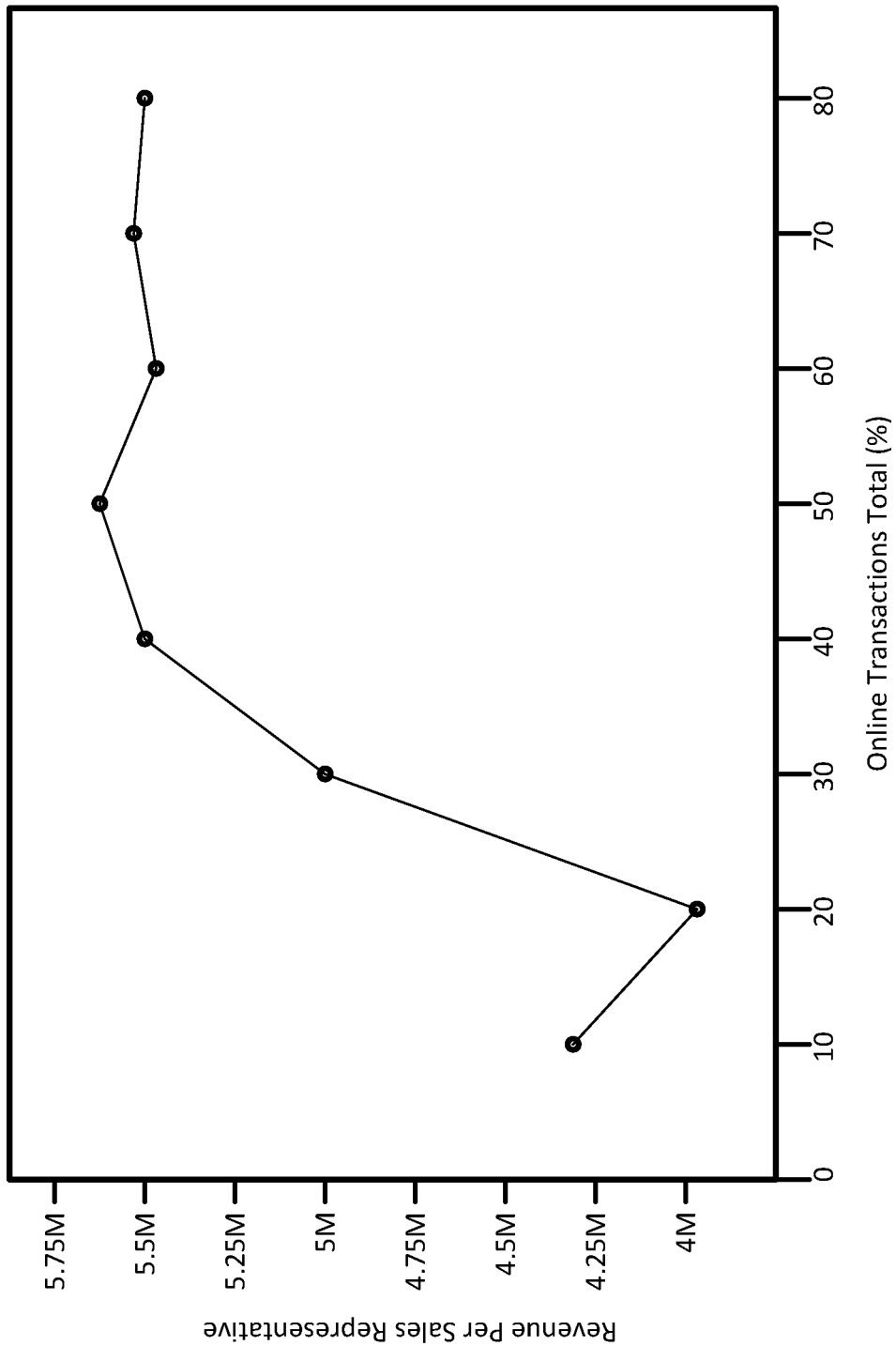
FIG. 3B shows an example in accordance with one or more embodiments of the invention.

FIG. 2 shows a flowchart describing a method for breakpoint analysis in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, an entity group data set is obtained. In one or more embodiments, the entity group data set is obtained by a breakpoint identification device. In one or more embodiments, the entity group data set is obtained from any one or more data sources. In one or more embodiments, the entity group data set is obtained via any technique for receiving data, such as, for example, over a network, manually, etc. The entity group data set may be received at one time, or may be received at any number of different times and aggregated to form the entity group data set.

In Step 202, the entity group data set obtained in Step 200 is used to generate any number of derived data items. In one or more embodiments, the derived data items are generated using any technique for analyzing a data set. In one or more embodiments, one or more data items from the entity group data set corresponding to an individual entity in the group may be used to derive additional data items corresponding to the individual. As an example, if the individual entity is a sales representative and has a certain percentage or greater of accounts in a certain industry, then an industry focus data item may be derived for the individual entity. Any number of derived data items may be generated without departing from the scope of embodiments described herein. In one or more embodiments, the combination of the entity group data set and the derived data items may be referred to as an enhanced entity group data set.

In Step 204, a cluster analysis is performed using at least a portion of the entity group data set or enhanced entity group data set. In one or more embodiments, the cluster analysis is performed using any clustering algorithm suitable for organizing entities into two or more clusters based on variables associated with the entities. In one or more embodiments, only a portion of the variables in the entity group data are used to perform the clustering analysis. As an example, the clustering analysis may be performed using only certain variables that do not change frequently, such as number of years of tenure at a company, number of members on the team associated with the entity, etc.

In Step 206, an ML model is trained using the enhanced entity group data set. In one or more embodiments, any ML model suitable for predicting a result based on input variables may be used. In one or more embodiments, results, which are part of the enhanced entity group data set are used to validate the ML model to determine how well the ML model predicts the results.

In Step 208, variable importance to the ML model is assessed. In one or more embodiments, any technique (e.g., SHAP scores) is used to determine which input variables are important to predicting the result accurately. In one or more embodiments, training the ML model includes determining how many less important variables may be removed from the required set of input variables while still maintaining a desired prediction accuracy threshold.

In Step 210, the set of input variables used for the trained model is reduced iteratively. As an example, input variables below an importance threshold may be removed, and the ML model may be re-executed to determine if the prediction accuracy is still at or above the desired threshold. If the threshold is still above the desired accuracy, then additional input variables below another importance threshold may be removed, and the ML model re-executed. In one or more embodiments, the aforementioned iterative process may be repeated any number of times to get a trained ML model that exhibits the desired level of prediction accuracy with the least number of input variables. In one or more embodiments, once a final set of important input variables has been identified, and the ML model still predicts results at or above the threshold, the ML model is trained, and may be referred to as a reduced trained ML model.

In Step 212, a breakpoint analysis is performed. In one or more embodiments, a breakpoint analysis is performed by generating simulated entities that are used as input to the reduced trained ML model, with one of the input variables being modified differently for each simulated entity to determine the effect of the modified variable on the result output by the ML model. In one or more embodiments, the simulated entities generated using the enhanced entity group data set. Thus, in one or more embodiments, the input variables other than the variable being modified are taken directly from or derived using the enhanced entity group data set.

In one or more embodiments, the results of the cluster analysis of Step 204 are used to select values for input variables other than the variable being modified, based on the modified value of the variable being modified. As an example, all sales representatives in a given cluster may be used as points on a scatterplot of a given input variable versus the variable being modified to ascertain actual values possible for the given variable when the modified variable is set to a certain value. Such a scatterplot analysis may be performed to derive values for all or any portion of the variables other than the variable being modified for the breakpoint analysis.

In one or more embodiments, the breakpoint analysis is performed for each variable, or any subset thereof, that is used as an input variable for the reduced trained ML model. In one or more embodiments, the result of the breakpoint analysis for each variable analyzed is a graph that shows the various modified values of the modified variable versus the result output by the reduced trained ML model when that value was used. In one or more embodiments, the graphs are then analyzed to identify breakpoints for a given variable. In one or more embodiments, a breakpoint is a modified variable value at which a change in rate of increase of result value occurs. For example, before a certain value of an input value, the result may increase rapidly, and after the value, the result value may increase less rapidly (e.g., the rate of increase 'flattens'). In one or more embodiments, such a value may be identified as a breakpoint. A breakpoint analysis graph for a given input variable may have any number of identified breakpoints without departing from the scope of embodiments described herein.

In Step 214, the results of the breakpoint analysis performed in Step 212 is provided to an interested entity. The results may be provided using any technique for conveying information. As an example, the results may be transmitted over a network. As another example, the results may be output (e.g., displayed) on a display (described below) to one or more interested entities. In one or more embodiments, the results include, but are not limited to, one or more identified breakpoints for each analyzed input variable, recommendations regarding actions to take based on the breakpoints, and/or any other information based on the breakpoint analysis.

Example Use Case

The above describes systems and methods for producing identifying breakpoints and providing recommendations based thereon. As such, one of ordinary skill in the art will recognize that there are many variations of how ML model training may occur, and how breakpoint analysis results may be produced, etc. However, for the sake of brevity and simplicity, consider the following simplified scenario to illustrate the concepts described herein.

Consider a scenario in which a company desires to increases sales revenue. In such a scenario, 100 data items corresponding to each sales representative in the company may be obtained as an entity group data set, for use as input variables to train an ML model. The entity group data set is analyzed to determine the industry focus of each sales representative based on the industries of the accounts they manage. Thus, industry focus, as a derived data item, is added to the set of data items for each sales representative to obtain an enhanced entity group data set corresponding to the sales representatives, which now includes 101 variables.

Next, a clustering analysis is performed using a subset of the data items of the sales representatives to generate clusters of similar sales representatives.

Next, the enhanced entity group data set is used to train an ML model to predict sales revenue for a sales representative based on a set of input variables. Initially, the entire enhanced entity group data set is used for the training, and SHAP scores are calculated for each of the 101 input variables. Input variables with the lowest SHAP scores are iteratively removed, and the ML model is re-trained, until there are nine variables left, but the accuracy of the sales revenue prediction is still at or above 80%. The resulting ML model may be referred to as a reduced trained ML model. The nine variables include online transactions as a percentage of total transactions, and average number of daily calls.

Next, a breakpoint analysis is performed using online transactions as a percentage of total transactions as the modified variable. To use this variable, a scatterplot is generated showing online transactions as a percentage of total transactions vs average daily calls, with each sales representative being a point on the scatterplot. Next, a set of simulated entities is generated at a variety of values for online transactions as a percentage of total transactions, with the value for average daily calls being selected to be within the range of possible values present on the scatterplot for a given value of online transactions as a percentage of total transactions.

Next, the reduced trained ML model is executed for each of the simulated entities in the set to determine the output sales revenue predicted by the ML model for each simulated entity. FIG. 3A shows the results of the analysis. Specifically, FIG. 3 shows the resulting sales revenue as the online transactions as a percentage of total transactions is increased in increments of 10% from 0% to 80%.

An analysis of the breakpoint graph shown in FIG. 3A identifies two breakpoints. The first breakpoint is at 30%, as sales revenue increases rapidly from 0% to 30%, but flattens out after 30%. Therefore, a first recommendation is created that recommends that sales representatives with online transactions as a percentage of total transactions less than 30% increase their online transactions as a percentage of total transactions to at least 30% in order to increase sales revenue. The next identified breakpoint is at 70%, as sales revenue increases rapidly prior to 70%, but the rate of increase flattens thereafter. Therefore, a second recommendation is created that recommends that sales representatives that already have online transactions as a percentage of total transactions over 30%, but that are below 70%, increase their online transactions as a percentage of total transactions to at least 70%. Additionally, a third recommendation is created that recommends that sales representatives that already have online transactions as a percentage of total transactions at 70% or greater do not need to focus on increasing the percentage any higher, as such effort would be for little or no further gain in sales revenue.

Next, a similar breakpoint analysis is performed for each of the other eight input variables of the reduced trained ML model to produce additional recommendations. The set results of the breakpoint analyses and the corresponding recommendations are then provided to various managers of sales representatives in the company in order to allow them to implement changes to influence the actions of the sales representatives in order to increase sales revenue.

Next, the same company would like a similar analysis performed for a certain cluster of sales representatives identified during the cluster analysis. Therefore, a similar analysis is performed, but based on data corresponding to sales representatives in the cluster. The results of the breakpoint analysis for online transactions as a percentage of total transactions for the cluster may be seen in FIG. 3B. An analysis of the breakpoint graph shown in FIG. 3B identifies one breakpoint at 40%, as sales revenue increases rapidly up to 40%, but flattens out after 40%. Therefore, another recommendation is created that recommends that sales representatives in the cluster with online transactions as a percentage of total transactions less than 40% increase their online transactions as a percentage of total transactions to at least 40% in order to increase sales revenue.

End of Example

Figure 4:
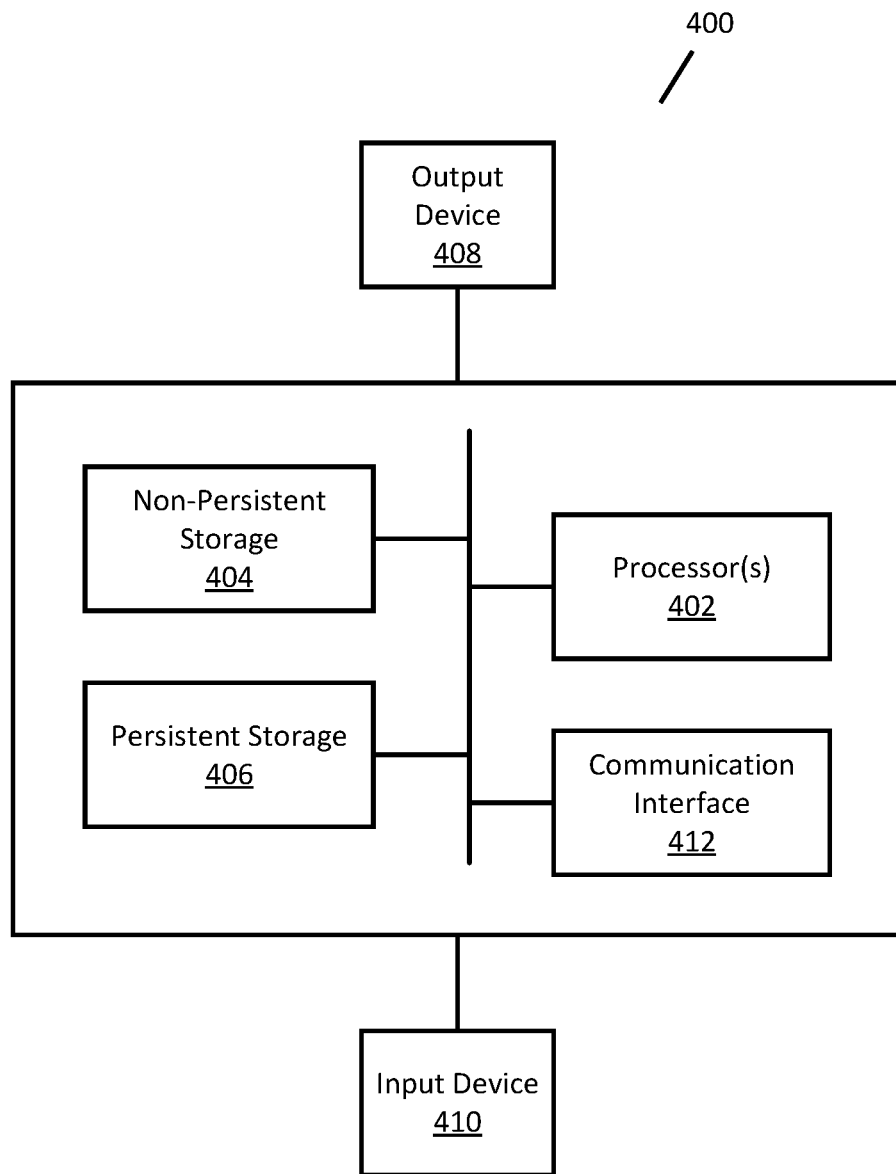
FIG. 4 shows a computing system in accordance with one or more embodiments of the invention.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for identifying breakpoints, the method comprising:
    obtaining, by a breakpoint identification device, an entity group data set corresponding to an entity group;
    generating, using the entity group data set, an enhanced entity group data set comprising the entity group data set and a derived data item, wherein each enhanced entity of the enhanced entity group data set comprises a set of input variables;
    performing a clustering analysis using at least a portion of the enhanced entity group data set to obtain a plurality of entity clusters;
    training a machine learning (ML) model using the enhanced entity group data set to obtain a trained ML model;
    using the trained ML model to determine a relative importance of the set of input variables for the trained ML model;
    reducing a quantity of input variables by:
        removing at least one input variable of the set of input variables based on the relative importance to obtain a first reduced set of input variables;
        training the ML model using the first reduced set of input variables to obtain a first reduced trained ML model;
        making a first determination that the first reduced trained ML model has a first prediction accuracy above a threshold;
        removing at least one input variable of the first reduced set of input variables based on the relative importance to obtain a second reduced set of input variables;
        training the first reduced ML model using the second reduced set of input variables to obtain a second reduced trained ML model; and
        making a second determination that the second reduced trained ML model has a second prediction accuracy above the threshold;
    generating, using the enhanced entity group data set, a set of simulated entities,
        wherein each simulated entity of the set of simulated entities comprises a modified variable of the set of important input variables;
    inputting the set of simulated entities into the reduced trained ML model to perform a breakpoint analysis;
    generating a breakpoint graph based on the breakpoint analysis; and
    providing recommendations to an interested entity based on a breakpoint identified using the breakpoint graph.

2. The method of claim 1, wherein the modified variable is online transactions as a percentage of total transactions.

3. The method of claim 1, wherein an additional variable of each simulated entity of the set of simulated entities is modified based on a value of the modified variable.

4. The method of claim 3, wherein the additional variable of each simulated entity of the set of simulated entities is modified based at least in part on a scatterplot comprising the modified variable and the additional variable.

5. The method of claim 1, wherein the recommendations correspond to an entity cluster of the plurality of entity clusters.

6. The method of claim 1, wherein the trained ML model predicts sales revenue for a sales representative.

7. A non-transitory computer readable medium comprising computer readable program code, which when executed by a computer processor enables the computer processor to perform a method for identifying breakpoints, the method comprising:
    obtaining, by a breakpoint identification device, an entity group data set corresponding to an entity group;
    generating, using the entity group data set, an enhanced entity group data set comprising the entity group data set and a derived data item, wherein each enhanced entity of the enhanced entity group data set comprises a set of input variables;
    performing a clustering analysis using at least a portion of the enhanced entity group data set to obtain a plurality of entity clusters;
    training a machine learning (ML) model using the enhanced entity group data set to obtain a trained ML model;
    using the trained ML model to determine a relative importance of the set of input variables for the trained ML model;
    reducing a quantity of input variables by:
        removing at least one input variable of the set of input variables based on the relative importance to obtain a first reduced set of input variables;
        training the ML model using the first reduced set of input variables to obtain a first reduced trained ML model;
        making a first determination that the first reduced trained ML model has a first prediction accuracy above a threshold;
        removing at least one input variable of the first reduced set of input variables based on the relative importance to obtain a second reduced set of input variables;
        training the first reduced ML model using the second reduced set of input variables to obtain a second reduced trained ML model; and
        making a second determination that the second reduced trained ML model has a second prediction accuracy above the threshold;
    generating, using the enhanced entity group data set, a set of simulated entities,
        wherein each simulated entity of the set of simulated entities comprises a modified variable of the set of important input variables;
    inputting the set of simulated entities into the reduced trained ML model to perform a breakpoint analysis;
    generating a breakpoint graph based on the breakpoint analysis; and
    providing recommendations to an interested entity based on a breakpoint identified using the breakpoint graph.

8. The non-transitory computer readable medium of claim 7, wherein the modified variable is online transactions as a percentage of total transactions.

9. The non-transitory computer readable medium of claim 7, wherein an additional variable of each simulated entity of the set of simulated entities is modified based on a value of the modified variable.

10. The non-transitory computer readable medium of claim 9, wherein the additional variable of each simulated entity of the set of simulated entities is modified based at least in part on a scatterplot comprising the modified variable and the additional variable.

11. The non-transitory computer readable medium of claim 7, wherein the recommendations correspond to an entity cluster of the plurality of entity clusters.

12. The non-transitory computer readable medium of claim 7, wherein the trained ML model predicts sales revenue for a sales representative.

13. A system for identifying breakpoints, the system comprising:
a breakpoint identification device, executing on a processor comprising circuitry, and configured to:
obtain, by a breakpoint identification device, an entity group data set corresponding to an entity group;
generate, using the entity group data set, an enhanced entity group data set comprising the entity group data set and a derived data item, wherein each enhanced entity of the enhanced entity group data set comprises a set of input variables;
perform a clustering analysis using at least a portion of the enhanced entity group data set to obtain a plurality of entity clusters;
train a machine learning (ML) model using the enhanced entity group data set to obtain a trained ML model;
use the trained ML model to determine a relative importance of the set of input variables for the trained ML model;
reducing a quantity of input variables by:
removing at least one input variable of the set of input variables based on the relative importance to obtain a first reduced set of input variables:
training the ML model using the first reduced set of input variables to obtain a first reduced trained ML model;
making a first determination that the first reduced trained ML model has a first prediction accuracy above a threshold;
removing at least one input variable of the first reduced set of input variables based on the relative importance to obtain a second reduced set of input variables;
training the first reduced ML model using the second reduced set of input variables to obtain a second reduced trained ML model; and
making a second determination that the second reduced trained ML model has a second prediction accuracy above the threshold;
generate, using the enhanced entity group data set, a set of simulated entities,
wherein each simulated entity of the set of simulated entities comprises a modified variable of the set of important input variables;
input the set of simulated entities into the reduced trained ML model and a set of simulated entities to perform a breakpoint analysis;
generate a breakpoint graph based on the breakpoint analysis; and
provide recommendations to an interested entity based on a breakpoint identified using the breakpoint graph.

14. The system of claim 13, wherein:
the modified variable is online transactions as a percentage of total transactions, and
an additional variable of each simulated entity of the set of simulated entities is modified based on a value of the modified variable.

15. The system of claim 13, wherein the trained ML model predicts sales revenue for a sales representative.

* * * * *